United States Patent [19]

Hirota et al.

[11] 4,225,553

[45] Sep. 30, 1980

[54] METHOD OF MANUFACTURING LOW-RIGID, WRINKLE-FREE ARTICLES

[75] Inventors: Kazumi Hirota, Tokyo; Kikuo Matsuoka, Fujisawa, both of Japan

[73] Assignee: Toyo Seikan Kaisha, Limited, Tokyo, Japan

[21] Appl. No.: 921,162

[22] Filed: Jul. 3, 1978

[30] Foreign Application Priority Data

Jul. 5, 1977 [JP] Japan .................. 52-79532

[51] Int. Cl.² ............... B29C 17/02; B29C 25/00
[52] U.S. Cl. ................. 264/292; 264/316; 264/320; 264/322; 264/337; 425/398
[58] Field of Search ........... 264/292, 313, 316, 324, 264/322, 337, 320; 425/398

[56] References Cited

U.S. PATENT DOCUMENTS

| | | | |
|---|---|---|---|
| 2,697,057 | 12/1954 | Senger et al. | 264/292 |
| 3,207,821 | 9/1965 | Hinton et al. | 264/292 |
| 3,340,714 | 9/1967 | Pohl et al. | 264/292 |
| 3,932,575 | 1/1976 | Andersson | 264/292 |

*Primary Examiner*—Donald J. Arnold
*Attorney, Agent, or Firm*—Martin A. Farber

[57] ABSTRACT

A thin sheet having a low rigidity is drawn while being depressed over the radiused corner of a die by elastic force or hydrostatic force to obtain a formed article whose sidewall part and flange part have no wrinkles. The force is applied through an elastic rubber provided around the punch and having an outside diameter larger than the inside diameter of the die cavity, or through an annular rigid body on which elastic pressure or fluid pressure is exerted. The hardness of the rubber is preferably approximately 70 to 85 in accordance with ASTM D 2240 Durometer A. A laminate not more than about 200 μm in thickness and consisting of a thermoplastic resin film, aluminum foil and a heat-sealable resin film is drawn into a formed article or a container which is light in weight and suitable for containing foods, for instance.

11 Claims, 7 Drawing Figures

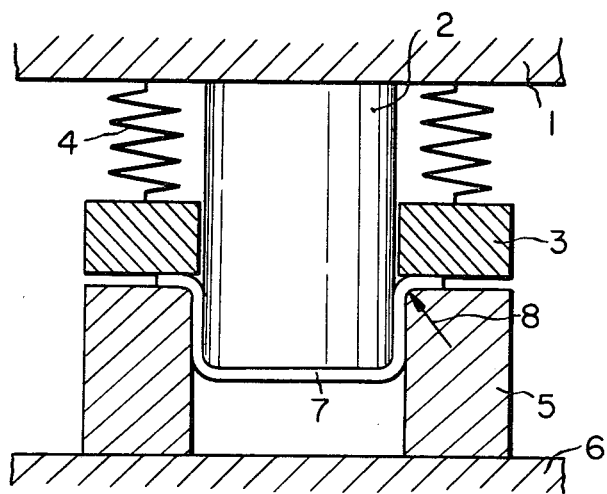
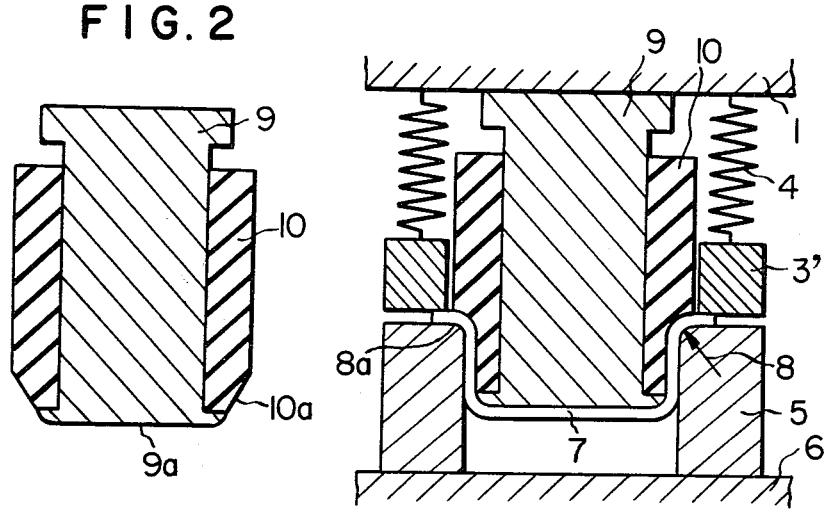

METHOD OF MANUFACTURING LOW-RIGID, WRINKLE-FREE ARTICLES

BACKGROUND OF THE INVENTION

This invention relates to a method of drawing a metal foil or sheet, or plastic film or sheet, or their laminate into formed articles, and equipment for practicing same and formed articles manufactured by the method. The present invention is directed more particularly to a method of drawing a metal foil or sheet, or a plastic film or sheet, or their laminate which is of the order of 7 to 200 $\mu$m in thickness and has a relatively low rigidity, into a formed article which has no wrinkles, and equipment for practicing same and formed articles manufactured by the method.

Containers extremely thin in wall thickness which are made of a metal foil or sheet such as aluminum foil or tin plate, or a plastic film or sheet, or their laminates, are extensively employed for packaging goods or medicines and food. However, such containers have scarcely been formed by drawing. This is due to the following reasons: These foil, sheet, film and laminate, namely, blanks are less in rigidity. Accordingly, if the blanks are drawn by the ordinary drawing method, wrinkles are significantly created on the formed article or container or shell at the radiused corner of the die and are distributed substantially entirely over the flange and the sidewall portion of the shell. This will undoubtedly defile the appearance of the containers. In addition, it is impossible to hermetically seal the containers with their flange portions by lids so as to prevent leakage of the contents and deterioration of the contents due to entry of air and moisture.

In order to overcome this difficulty, a method is extensively employed in which, after heat-softened, a plastic film or sheet, or a composite film or sheet consisting of plastic materials is subjected to pressurized air forming or vacuum forming to produce a formed article. This method is a so-called bulging method which can be applied only to plastic films or sheets which extend 100% to 200% or more at heat-softened state. Accordingly, this method is disadvantageous in that a step of heating is required, and unlike drawing, it is impossible to subject the blank to cold forming which is carried out at room temperature or a temperature around the room temperature. It goes without saying that this method cannot be applicable to aluminum foil or tin foil.

In the case where containers are made of plastic only, it has been found that it is rather difficult to attain complete barrier for oxygen or moisture, that is, such containers are not suitable in the field of packaging foods to be preserved for a long time at room temperature where sophisticated technique is required. In order to eliminate this drawback, a laminate of aluminum foil, or the like, and plastic films or sheets has been provided recently. In this case, in view of material saving and cost reduction, the aluminum foil should be as thin as possible, but to the extent that the contents in the container is prevented from inroading of oxygen and moisture. Accordingly, laminates made of a thin aluminum foil 7 to 30 $\mu$m in thickness and polyester, polyethylene, polypropylene, nylon or polycarbonate films etc. several to several tens of $\mu$m in thickness have been provided to package foods or the like. However, since the laminate of this type contains aluminum foil, the elongation thereof is no more than several to 50%, and therefore manufacturing a formed article from the laminate in accordance with the above-described pressurized air or vacuum forming is practically impossible. Accordingly, such laminates are used mainly for manufacturing pouches.

In a drawing method, unlike a bulging method, the thickness of a blank sheet is scarcely changed during drawing, and the elongation of the blank needs not to be so high. Accordingly, in the drawing method, it is possible to obtain a formed article such as a cup by subjecting the aforementioned very thin metal foil or sheet, or a plastic film or sheet or laminates thereof to cold-drawing. However, in this conventional drawing, wrinkles are remarkably created on the formed article at the radiused corner of the die, and therefore heretofore it is impossible to manufacture formed articles which can be commercialized.

In other words, in the conventional drawing, when a blank is drawn into the die by the punch, the blank has a portion which is not restrained on the radiused corner of the die. However, in the case where the blank is sufficiently thicker than 200 $\mu$m and especially it is a metal sheet, the rigidity of the blank is considerably high, so that wrinkles are scarcely created on the formed article at the radiused corner. On the contrary, the rigidity of a plastic laminate thinner than 200 $\mu$m including a thin aluminum foil 7 to 30 $\mu$m is relatively low, and therefore if this plastic laminate is drawn in accordance with the conventional method, wrinkles will be necessarily created.

SUMMARY OF THE INVENTION

In view of the foregoing, a primary object of this invention is to provide a drawing method in which creation of wrinkles on a formed article at the radiused corner of the die is prevented.

A further object of the invention is to provide a drawing equipment in which a thin sheet having a relatively low rigidity can be drawn without creating wrinkles on a formed article at the radiused corner of the die.

A still further object of the invention is to provide a formed article fine in appearance without wrinkles which is obtained by drawing a metal foil or sheet, or a plastic film or sheet, or their laminate about 7 to 200 $\mu$m in thickness.

A specific object of the invention is to provide a formed article fine in appearance without wrinkles which is obtained by drawing a laminate consisting of a metal foil of about 7 to 30 $\mu$m and plastic films of several to about one hundred of $\mu$m in thickness.

In this invention, a force for resisting creation of wrinkles on a blank low in rigidity being drawn, that is, elastic force or hydrostatic force is applied to the blank at the radiused corner of the die substantially throughout the drawing operation, thereby to provide a formed article having no wrinkles.

The novel features which are considered characteristic of this invention are set forth in the appended claims. This invention itself, however, as well as other objects and advantages thereof will be best understood by reference to the following detailed description of illustrative embodiments, when read in conjunction with the accompanying drawings, in which like parts are designated by like reference numerals.

BRIEF DESCRIPTION OF THE DRAWINGS

In the accompanying drawings:

FIG. 1 is a sectional view for a description of a conventional drawing method;

FIG. 2 is a sectional view showing a punch employed in this invention;

FIG. 3 is a sectional view for a description of a drawing method using the punch shown in FIG. 2.

DETAILED DESCRIPTION OF THE INVENTION

Figure 4:
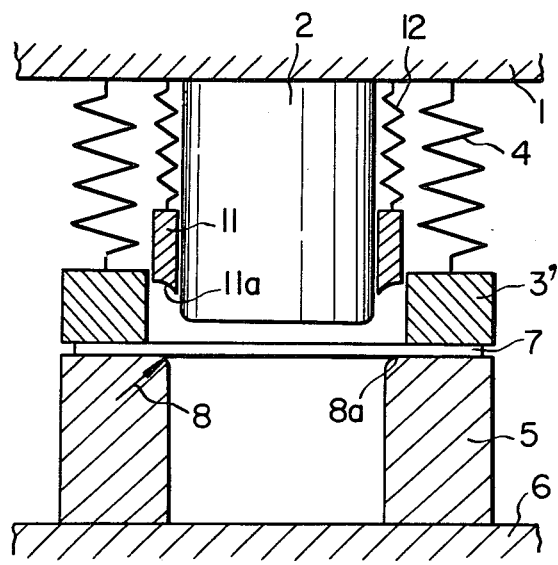
FIGS. 4 through 7 are sectional views showing other embodiments of the invention.

FIG. 1 is an explanatory diagram for a description of a conventional drawing method. Referring to FIG. 1, a punch 2 is fixedly secured to a bolster 1, and a blank holder 3 is connected to the bolster 1 through a cushioning means 4 which utilizes a spring, pneumatic pressure or liquid pressure. A die 5 is affixed to a ram 6. In FIG. 1, the bolster and the ram are arranged above and below, respectively; however, the arrangement of them may be reversed. This can be applied to FIGS. 3 through 6. A blank to be drawn, or a thin sheet 7 (hereinafter referred to as "a workpiece 7" when applicable) is clamped between the blank holder 3 and the die 5 under a suitable pressure, and is then drawn as the punch enters the die. In this drawing operation, no force is exerted on a portion of the sheet 7, which lies on the radiused corner 8 of the die 5, by the blank holder 3, and therefore the portion is in a so-called free state until the punch 2 is brought into contact therewith. Consequently, wrinkles will be produced on the portion by circumferential compressive force, if the sheet is a thin one having a low bending rigidity.

In this invention, the above-described difficulty is eliminated by using a drawing machine described below, and particularly a punch described below in the drawing machine. That is, the drawing machine comprises a punch and a die having a cavity corresponding to the punch, so that a thin sheet is drawn into the cavity of the die by the punch thereby to form a formed article. In this machine, at least the core of the punch is made of rigid material, and the side wall of the punch is made of elastic material. Furthermore, the cross-sectional area of the punch is larger than that of the mouth of the die cavity. Therefore, a portion of the sheet which lies on the die radiused corner is depressed by the elastic side wall of the punch. In other words, the surface of the sheet which is opposite to a face of the sheet contacting the radiused corner of the die is depressed by the elastic sidewall of the punch substantially throughout drawing process. As a result, creation of wrinkles on the formed article at the die radiused corner can be prevented.

FIG. 2 shows one example of the punch described above. As is apparent from FIG. 2, the punch comprises a cylindrical core 9 made of a rigid material such as metal or engineering plastic, and an elastic wall 10 of, for instance, rubber is wrapped around the cylindrical core 9. More specifically, the core 9 has a circular end portion 9a at its one end, and it is surrounded by the elastic wall 10 in the form of a circumferential side wall with exception of the end portion 9a, which consists of an end face and a radiused corner adjacent thereto. The diameter of the elastic wall 10 is larger than that of the end portion 9a. Preferably, the elastic wall 10 is finely secured to the core 9 with an adhesive.

The maximum diameter of the end portion 9a of the core 9 is substantially equal to that of a conventional punch, and it can be obtained by subtracting two times the clearance from the inside diameter of the die cavity. As was described, the end portion 9a is made of rigid material. This is to permit the size and dimensions of the bottom and its radiused corner of a formed article to conform to predetermined values. The diameter of the core 9 is smaller than the inside diameter of the die cavity.

The lower portion of the elastic wall 10 is tapered as indicated by reference character 10a. This is to facilitate insertion or entry of the punch into the die and to protect the lower end portion of the elastic wall 10 from damage. In FIG. 2, the elastic wall 10 consists of a tapered section and a cylindrical section; however, the cylindrical section may be slightly tapered to be narrower upwardly. The maximum diameter of the elastic wall 10 is substantially equal to or somewhat larger than the diameter of a circle 8a which is formed by the intersecting line of the die radiused corner and the upper plane of the die.

The material of the elastic body 10 may be any one of the rubbers (which are valcanized or include additives such as carbon black, white carbon, age resistor or coloring agent) consisting of acrylic rubber, nitrile rubber, stereo-rubber, styrene butadiene rubber, chloroprene rubber, butyl rubber, fluororubber, silicon rubber, Hypalon (made by DuPont Co.) and polyurethane rubber. Among these material, the polyurethane rubber is most suitable as a material of the elastic wall 10 in view of its abrasion resistance, oil resistance, and excellent strength.

It is preferable that the hardness of the elastic wall 10 is within in a range of from about 70 to about 85 (according to ASTM D 2240, Durometer A). As is indicated in Table 1 described below, in the case where the hardness is lowered than 70, the depression force of the elastic body 10 exerted on the work-piece is not sufficient at the die radiused corner, and therefore wrinkles are significantly created on the flange section and sidewall section of the formed article. If the hardness exceeds 85, the formed article may be broken during the drawing operation.

The experiments indicated in Table 1 were performed under the following conditions:

(1) The work-pieces (thin sheets): Blanks obtained by stamping a laminate which are obtained by laminating a polyethylene terephthalate sheet 12 $\mu$m in thickness, an aluminum foil 9 $\mu$m in thickness and a high density polyethylene film 70 $\mu$m in thickness in the stated order with an adhesive. The blanks have a diameter of 125 mm. The blanks are placed on the machine so that the polyethylene film is brought into contact with the punch.

(2) The press machine: The punch indicated in FIG. 2 (with a polyurethane rubber wall) is used, with the inside diameter of the die cavity being 65 mm.

(3) The pressing conditions: A force of three tons is applied to the blank holder. Both surface of a workpiece is coated with palm oil as lubricating oil. The work-piece is pressed at a rate of 100 pieces/min.

(4) Formed article dimension: The outside diameter 65 mm, the depth 25 mm, and the flange section's width 5 mm.

A value of load to be applied to the blank holder 3 depends on the thickness, material and configuration of a work-piece; however, it is preferable that it is about 2–4 tons for the laminates indicated in Table 1, or the like. If it is less than 2 tons, wrinkles are liable to be created on a formed article; and if it is more than 4 tons, the article is liable to be broken.

As shown in FIG. 3, in the case where a blank holder 3' whose inside diameter is larger than that of the blank holder 3 shown in FIG. 1 clamps a work-piece 7 (or a thin sheet) on the die, if the work-piece 7 is drawn into the die cavity while being restrained on the die radiused corner 8 by elastic pressure of the elastic wall substantially throughout the drawing, then creation of wrinkles can be prevented; that is, a shell fine in appearance can be produced without wrinkles.

A container 58 mm in diameter and 30 mm in depth was produced from a blank 115 mm in diameter in accordance with this method. In this case, containers without wrinkles could be formed by using laminates which were obtained by covering both surfaces of aluminum foil respectively with polyester and polyethylene, and laminates of aluminum foil and polyester film as indicated in Table 2.

TABLE 1

| Hardness | 60 | 70 | 75 | 80 | 85 | 90 |
|---|---|---|---|---|---|---|
| Wrinkle creation | Significant | Slight (1) | Very slight (1) | None | None | — |
| Breakage | None | None | None | None | None | Some |

Note:
(1) The wrinkles are out of the problem in practical use.

TABLE 2

| (Die side) Polyester (thickness) | Aluminum foil (thickness) | (Punch side) Polyethylene (thickness) |
|---|---|---|
| 12 μm | 9 μm | — |
| 12 μm | 9 μm | 70 μm |
| 12 μm | 20 μm | — |
| 12 μm | 20 μm | 70 μm |
| 12 μm | 30 μm | — |
| 12 μm | 30 μm | 70 μm |
| 100 μm | 9 μm | — |
| 100 μm | 9 μm | 70 μm |
| 100 μm | 20 μm | — |
| 100 μm | 20 μm | 70 μm |
| 100 μm | 30 μm | — |
| 100 μm | 30 μm | 70 μm |

Shown in FIG. 4 is another embodiment of this invention in which an additional means for restraining a work-piece at the radiused corner of a die is employed.

The drawing machine shown in FIG. 4 comprises a punch, and a die having a cavity corresponding to the punch, so that a thin sheet having a relatively low rigidity is drawn into the cavity of the die to form a formed article or a shell. This drawing machine further comprises a depressing member in the form of an annular rigid body, is movably placed around the punch. In a drawing operation, the depressing member is brought into contact with the surface of the sheet, which is opposite to a face of the sheet which is brought into contact with the radiused corner of the die, so that the sheet is depressed over the radiused corner of the die by the elastic or hydraulic force through the depressing member substantially throughout the drawing. In this embodiment, an ordinary punch 2 is employed unlike the embodiment shown in FIG. 2 in which the punch has the elastic wall, and in addition to a blank holder 3', the depressing member 11 is connected through a cushioning member 12 such as springs, pneumatic or hydraulic pressure devices to a bolster 1 so as to prevent creation of wrinkles on work-pieces.

The depressing member 11 operates to slide along the outer wall of the punch 2. The outside diameter of the depressing member 11 is substantially equal to the diameter of a circle 8a which is formed by the intersecting line of the die radiused corner 8 and the upper plane of the die. The lower end surface 11a of the depressing member 11 is so formed as to substantially conform to the shape of the die radiused corner 8 so that the elastic or hydraulic pressure is uniformly applied to the die radiused corner 8.

In drawing operation, first only the punch 2 depresses the workpiece 7. As soon as the work-piece 7 is brought into contact with the entire die radiused corner 8, the cushioning member 12 is operated to move the depressing member 11. As a result, the lower end surface 11a of the depressing member 11 depresses the upper surface, as viewed in the FIG. 5, of the portion of the work-piece which is in contact with the die radiused corner 8. This depression is carried out until the drawing is completed.

Figure 5:
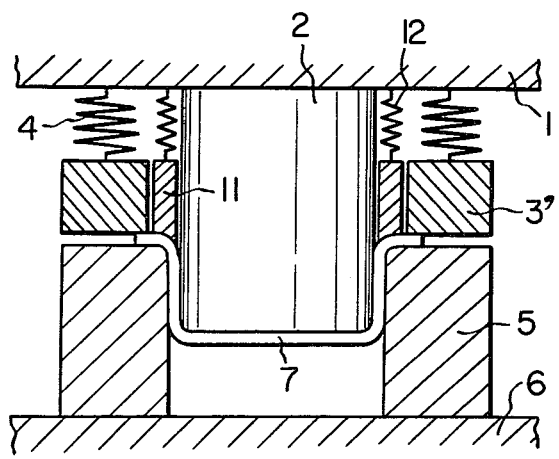

FIG. 5 shows a state of the work-piece which has been drawn by the drawing machine. The pressure generated by the cushioning member 12 is applied through the depressing corner 11 to the work-piece to prevent creation of wrinkles thereon.

Figure 6:
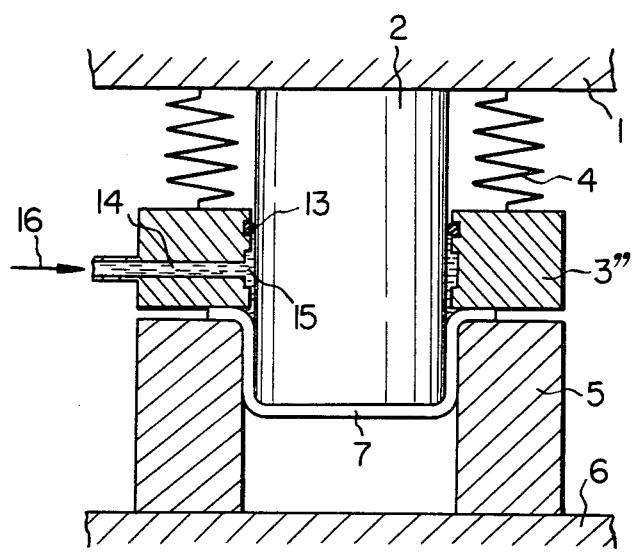
Figure 7:
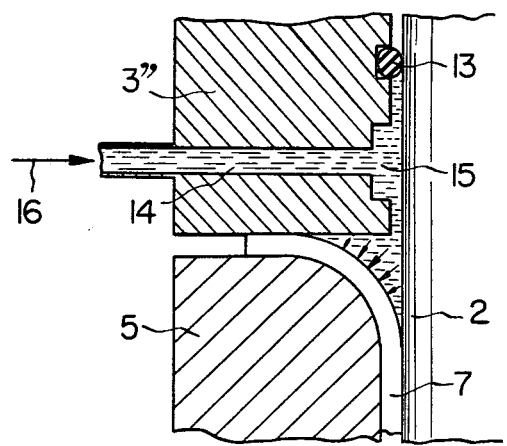

FIG. 6 shows a further example of the drawing machine according to the method of this invention. FIG. 7 is an enlarged view showing the die shoulder and elements in the vicinity thereof in the drawing machine.

This drawing machine comprises a punch, a die having a cavity corresponding to the punch, and a blank holder surrounding the punch, so that a thin sheet, or a work-piece, having a relatively low rigidity is drawn into the die cavity while being clamped between the die and the blank holder. In this machine, a sealing member 13 such as an "O" ring is placed between the punch and the blank holder to form a space or an annular groove defined by the punch, the sealing member and the blank holder. The blank holder is provided with a port communicated with the space so that pressurized fluid is supplied into the space. In this case, the upper surface of the portion of the thin sheet which is brought into contact with the die radiused corner 8 is depressed by the hydrostatic pressure of the fluid supplied into the space substantially throughout the drawing process to prevent creation of wrinkles on the workpiece which otherwise may be formed in its portion at the die radiused corner.

More specifically, referring to FIGS. 6 and 7, the fluid is supplied through the port 14 formed in the blank holder 3" into the space (or annular groove) 15 under pressure. As was described above, the port 14 is communicated with the annular groove 15 surrounding the punch, and the pressurized fluid applied through the port 14 to the groove 15 serves to pressurize the thin sheet 7 at the die radiused corner thereby to prevent creation of wrinkles thereon. Reference 13 is the aforementioned sealing member or "O" ring which is provided to prevent the leakage of the fluid through the gap between the blank holder 3" and the outer wall of the punch 2. When the punch 2 reaches its bottom dead point, a valve (not shown) provided in the port 14 is automatically closed. In this embodiment, as the space 15 is considerably small, the amount of fluid to be used can be very little.

The invention has been described with the particular embodiments; however, it should be noted that the invention is not limited thereto or thereby. A blank, such as a metal foil or thin sheet, to be employed according to the present invention may be iron, steel, copper and nickel sheets or tin plate, or sheets made of alloys of these materials, or such sheets coated with lacquers or subjected to surface treatment. A blank, such as a plastic film or sheet, to be employed in this invention may be polypropylene, nylon and polycarbonate sheets or their laminates. Polyester or polycarbonate sheets can be solely drawn because they can be subjected to cold forming.

The method and equipment according to the invention is most applicable to a film laminate less than about 200 μm which consists of an aluminum foil about 7–30 μm in thickness and plastic films covering the two surfaces of the aluminum foil.

If the surface of the laminate which is brought into contact with the punch during the drawing operation, that is, the layer of the laminate which is the inner surface of the formed article is of heat-sealable resin, a sealed container light in weight can be obtained with its lid heat sealed. This container can be subjected to retort sterilization, and, therefore, it is suitable as a container for foods, beverages and the like which can be preserved at room temperature. The heat-sealable resin may be polyolefins such as polyethylene and polypropylene, or nylon 11 or nylon 12 or polyester ether resin or their copolymers and blends, for instance.

The plastic film of the laminate which is brought into contact with the die serves to protect the intermediate layer or the aluminum foil from corrosion, to improve lubrication in drawing, and to maintain the configuration of a formed article.

Plastics preferable for this purpose are oriented or non-oriented polyethylene terephthalate, polyimid resin, polypropylene, polycarbonate, and their copolymers and blends, and furthermore other cold-formable synthetic resins.

The term "foil" or "film" as used herein is, in general, intended to mean a foil or film thinner than 100 μm, and the term "sheet" means a sheet thicker than 100 μm. The present invention is most suitable for drawing a thin work-piece having relatively low rigidity whose thickness is less than about 200 μm. As indicated in Table 2, the present invention is sufficiently applicable to sheets ranged from 20 μm to about 200 μm in thickness.

The embodiments of the invention have been described with reference to normal drawing. However, it should be noted that the invention can be applied to deep-drawing as well as drawing-bulging in which the bottom of a formed article is subjected to bulging, to the extent that the article is not broken.

The method and equipment according to the invention can draw a thin sheet into various configurations of the sidewall section such as circle, ellipse, corner-rounded triangle, rectangle, hexagon, and corner-rounded polygon.

The forming temperature is not always limited to room temperature; that is, it may be higher than room temperature where required, if it does not damage a work piece and the elastic wall such as rubber employed for the punch.

As is apparent from the above description, according to the invention work-pieces such as metal foils or sheets or plastic films or sheets or their laminates which are relatively low in rigidity can be drawn into beautiful shells such as containers without wrinkles, although production of such articles has been impossible by the conventional method. Since the container produced according to the invention has no wrinkles, the container can be hermetically sealed with its flange and the lid. Accordingly, the containers are most suitable for cooked foods or medicines and so forth which should preserved for a long time at room temperature and should be prevented from inroading of oxygen and moisture.

What is claimed is:

1. A method of manufacturing a formed article comprising the steps of
   bringing a thin sheet having a relatively low rigidly on a die having a radiused corner and a cavity with one surface of the sheet in contact with the radiused corner,
   drawing the thin sheet having relatively low rigidity into the cavity of the die substantially without stretching the sheet and without changing the thickness of the sheets by means of a punch until a formed article is formed, by the step of drawing said thin sheet over the radiused corner of the die while depressing an opposite surface portion of said thin sheet, which opposite surface portion is opposite to a portion of said one surface of said thin sheet that is in contact with the radiused corner, substantially throughout the entire drawing operation until formation of the formed article, thereby preventing creation of wrinkles on said formed article.

2. The method as set forth in claim 1, wherein edges of the thin sheet move relative the die toward the cavity during the drawing operation.

3. The method as set forth in claim 1, wherein the drawing step is performed by cold-drawing without a heating step.

4. The method as set forth in claim 1, wherein the depressing step is performed by pressing the opposite surface portion by means separate from the punch while performing a movement of the thin sheet on the radiused corner into the cavity.

5. A method as claimed in claim 1, in which the thickness of said thin sheet is from approximately 7 to 200 μm.

6. A method as claimed in claim 1, in which said punch is made up of a core section made of a rigid material and an elastic wall section made of an elastic material and surrounding said core section, the cross-sectional area of said punch being larger than that of the mouth of said cavity in said die so that said sheet is drawn while said surface of said sheet being depressed over said radiused corner of said die by an elastic pressure of said elastic wall section of said punch, substantially throughout drawing.

7. A method as claimed in claim 1, in which said elastic material forming said elastic wall section is rubber whose hardness is from about 70 to 85 in accordance with ASTM D 2240 Durometer A hardness test.

8. A method as claimed in claim 6, in which one end portion of said elastic wall section of said punch confronting said thin sheet is in the form of a taper.

9. A method as claimed in claim 1, in which a depressing member is movably placed around said punch in such a manner that said depressing member is brought into contact with said opposite surface of said thin sheet over said radiused corner of said die and said sheet is depressed by said depressing member substantially throughout the drawing.

10. A method as claimed in claim 9, in which said depressing member is an annular rigid body.

11. A method as claimed in claim 1, in which said sheet is drawn while said opposite surface of said sheet being depressed over said radiused corner of said die by hydrostatic pressure, substantially throughout drawing.

* * * * *